March 24, 1925.

H. W. EVERITT

TESTING VACUUM TUBES

Filed Nov. 6, 1920　　2 Sheets-Sheet 1

Inventor:
Herbert W. Everitt.
by J. C. Roberts
Atty.

March 24, 1925.

H. W. EVERITT

TESTING VACUUM TUBES

Filed Nov. 6, 1920

1,530,988

2 Sheets-Sheet 2

Inventor:
Herbert W. Everitt.
by J. G. Roberts
Atty.

Patented Mar. 24, 1925.

1,530,988

UNITED STATES PATENT OFFICE.

HERBERT W. EVERITT, OF SPRINGFIELD GARDENS, NEW YORK, ASSIGNOR TO WESTERN ELECTRIC COMPANY, INCORPORATED, OF NEW YORK, N. Y., A CORPORATION OF NEW YORK.

TESTING VACUUM TUBES.

Application filed November 6, 1920. Serial No. 422,195.

*To all whom it may concern:*

Be it known that I, HERBERT W. EVERITT, a citizen of the United States, residing at Springfield Gardens, in the county of Queens and State of New York, have invented certain new and useful Improvements in Testing Vacuum Tubes, of which the following is a full, clear, concise, and exact description.

The invention is for measuring the operational constants of electron discharge devices, and has for an object to facilitate this measurement. The constants which it is desired to measure are one or more of the following: amplification factor $U\,O$, which is the ratio of the amplified current from the output circuit of the tube to the potential applied to the input; cathode-anode impedance $R_p$, i. e., the internal output circuit impedance of the tube; and the mutual conductance $\frac{U\,O}{R_p}$.

This object is accomplished by providing a test set whereon the value of the constants of the tube can be read directly from dials.

In the specific embodiment of the invention hereinafter described in detail a null method is employed, i. e., a variable impedance is employed to vary the fraction of the amplified current in the output circuit of the tube required to balance the weak impulses applied to the input, so that no tone is heard in a receiver connected to the tube circuit. By taking advantage of the equations which involve the tube constants it is shown that the variable impedance may be calibrated to indicate directly the values of the tube constants.

Figure 1:
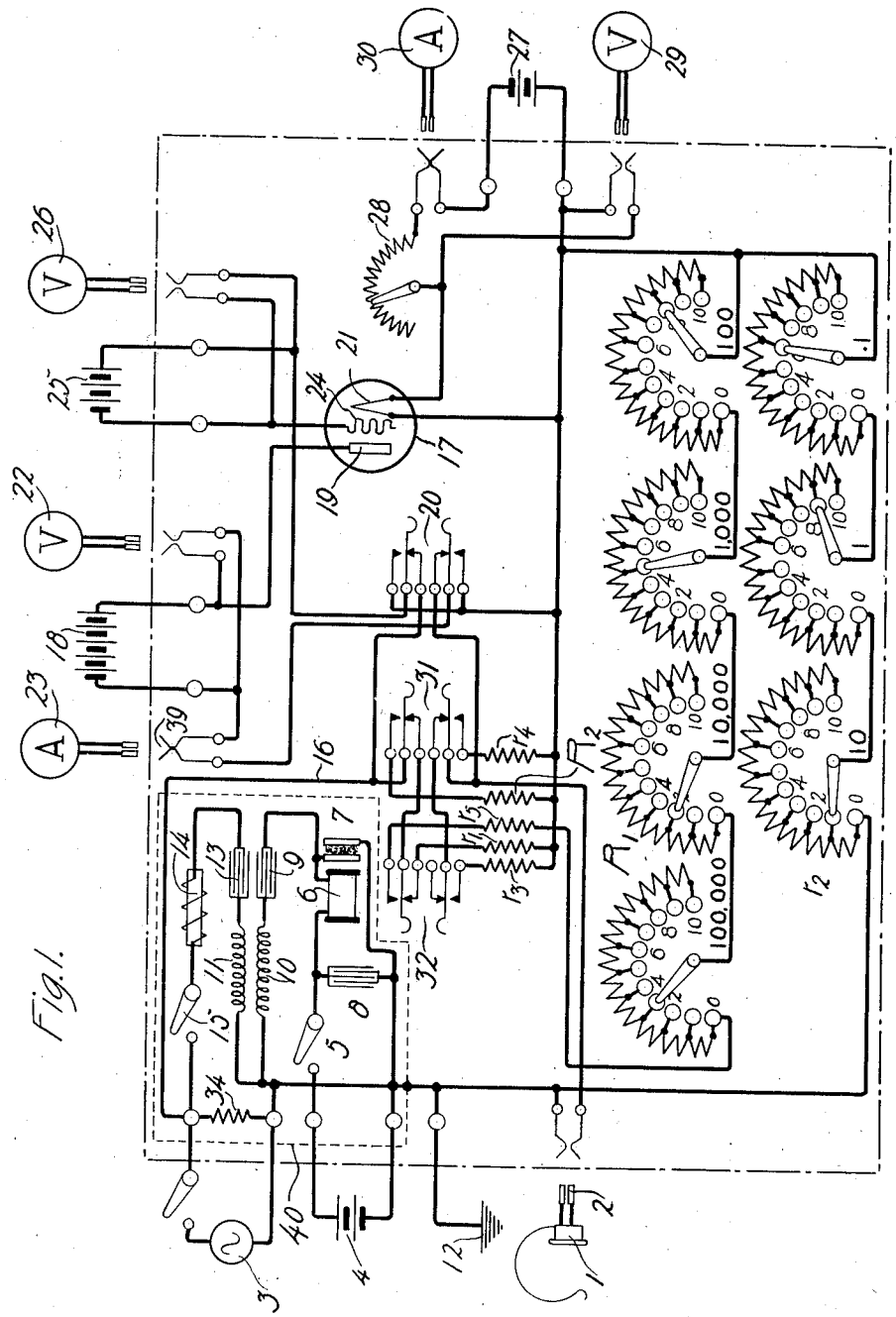
Figure 2:
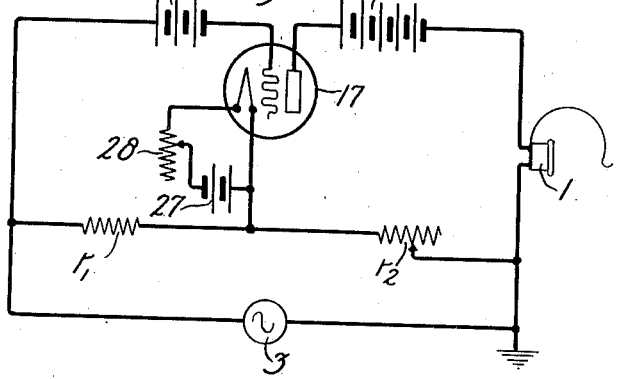
Figure 3:
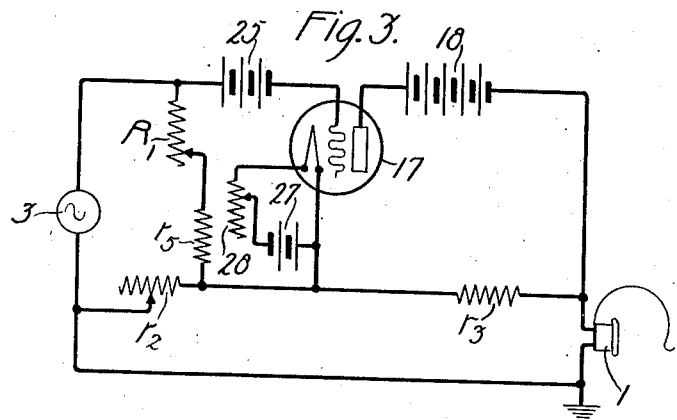
Figure 4:
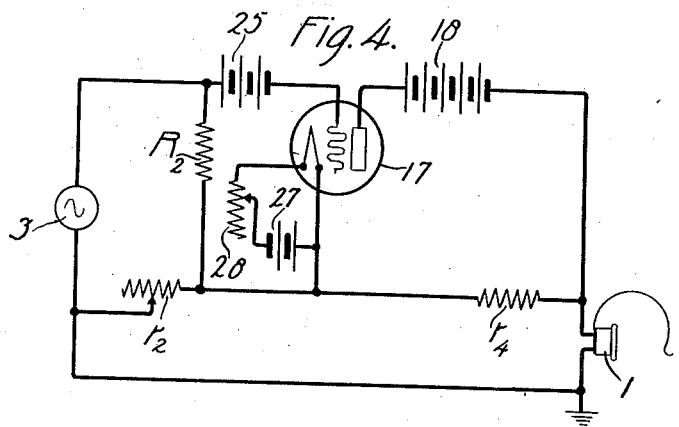

For further details of the invention reference may be made to the drawings, wherein Fig. 1 represents a test circuit having dials adapted to directly read the above mentioned tube constants. Figs. 2, 3 and 4 represent schematically the connections of the circuit shown in Fig. 1 for determining the amplification factor, the plate impedance and the mutual conductance, respectively.

Referring in detail to Fig. 1, the resistances $R_1$ and $r_2$ are adjusted in some cases separately and in other cases in combination, to have such values that a balanced electrical condition of the circuit exists whereby no tone is heard in the receiver 1 adapted to be connected with the plug 2, when a source of alternating current such as 3 energizes the tube circuit. Instead of source 3, shunted by resistance 34, there may be employed a buzzer source including battery 4 adapted to be connected by a switch 5 to the receiver coil 6 which energizes the transmitter 7. Condenser 8 may be connected in shunt to the transmitter 7. Current is generated by the receiver transmitter combination at an audible frequency. The winding 10 is the primary winding of a transformer and the buzzer currents generated are induced in the secondary winding 11, one terminal of which is connected to ground 12 and one side of the receiver or other indicator 1, the other terminal of which is connected through the condenser 13 and choke coil 14, through switch 15 when closed to the line 16. Condenser 13 and coil 14 have values such that the secondary circuit is resonant at the frequency of the buzzer currents. The buzzer and associated apparatus is shielded from the testing apparatus by a metallic shield 40 which is also connected to the ground 12.

Current for the anode circuit of the vacuum tube 17 to be tested is supplied by battery 18 with the keys in the position shown one terminal of the battery is connected to the anode 19, the other terminal being connected to the line including jack 39, switch 20, receiver 1, resistance $r_2$ and cathode 21. The voltage of and the current from the battery 18 may be determined by the volt meter 22 and ammeter 23, respectively. The potential of the grid 24 may be kept at a suitable constant potential with respect to the cathode by means of the battery 25 connected at one terminal to the grid and at the other terminal to the switch 20 which is connected to the cathode by the circuit previously traced. The voltage of the battery 25 may be determined by the volt meter 26.

Heating current for the filament is supplied by battery 27 in series with a variable resistance 28 to regulate the filament current. The voltage of and current from the battery 27 may be determined by the volt meter 29 and ammeter 30, respectively.

The resistances $r_1$, $r_3$, $r_4$, $r_5$ and $R_2$ may conveniently be constant resistances having the values of 10, 1,000, 100, 10 and 1,000 ohms respectively. The reasons for these particular values will be pointed out later.

In addition to the switch 20 are provided the switches 31 and 32, the functions of which will be described in detail in connection with Figs. 2 and 4.

The method for measuring will be described in connection with Fig. 2 and involves the method described by Van der Bijl in the "Proceedings of the Institute of Radio Engineers" for April, 1919. As shown in this article by Van der Bijl—

When the resistance $r_2$ is adjusted so that no tone is heard in the receiver 1, we obtain $$\mu_0 = \frac{r_2}{r_1} \quad (1)$$

The resistance of $r_1$ is made 10 ohms so as to obtain a sufficient potential on the grid of the tube. Therefore, in order to make the set direct reading, the dials of $r_2$ as shown in Fig. 1 are marked $\frac{1}{10}$ their ohmic resistance. According to the present invention this dial $r_2$ is also employed for directly reading one or more of the other tube constants.

The method of measuring $R_p$ is as follows, referring to Fig. 3. For zero tone in the receiver we have $$R_p = \frac{r_3}{r_2} \mu_0 (R_1 + r_5) - r_3 \quad (2)$$

The first step is to eliminate the factor $\mu_0$ which is done by adjusting $r_2$ in circuit (Fig. 2) corresponding to the value of $\mu_0$ and then transferring it by means of a key from the circuit shown in Fig. 2 to that shown in Fig. 3. This key is illustrated at 32 in Fig. 1. With the three keys 20, 31, and 32 in the positions shown, it will be seen that the circuit in Fig. 1 simplifies to that shown in Fig. 2 whereby the adjustment of the resistance $r_2$ may be made to obtain zero tone and indicate the amplification factor. Upon moving the key 32 to its alternate position, the circuit (Fig. 1) reduces to that shown in Fig. 3, as follows—The source 3 is connected by line 16 through two paths, one of which includes key 20 and battery 25 to the grid 24 which corresponds to the showing in Fig. 3. The other path may be traced through the closed contact of key 31, the upper contact (now closed) of key 32, through resistance $r_5$, and the variable resistance $R_1$ and variable resistance $r_2$ to the other side of the source 3. One terminal of the receiver 1 is connected to source 3 and to the left side of resistance $r_2$ and the other terminal is connected through key 20 to the anode 19 and through resistance $r_3$ to the cathode 21.

The effect or setting resistance $r_2$ in the circuit Fig. 2, and of transferring it by means of key 32 to the circuit shown in Fig. 3, is to relate $r_2$ to $\mu_0$ as follows:

$$r_2 = r_1 \mu_0 = 10 \mu_0 \quad \text{(from equation 1)}$$

substituting into equation (2), we get—

$$R_p = \frac{r_3}{10} R_1 + \frac{r_3 r_5}{10} - r_3 \quad (3)$$

The resistance $r_3$ is a constant and is given the value of 1,000 ohms in order that the resistance $R_1$ may be kept reasonably small. The resistance $r_5$ is also a constant resistance inserted in series with the resistance $R_1$ in order to express the plate circuit impedance of the tube $R_p$ directly in terms of the dial reading of resistance $R_1$. Thus by giving $r_5$ the value of 10 ohms the last two terms of equation (3) vanish and we have:

$$R_p = 100 R_1 \quad (4)$$

The dials of $R_1$ are marked 100 times their ohmic resistance so as to make the set direct reading.

In order to measure the mutual conductance $\frac{\mu_0}{R_p}$ the key 31 is moved to its alternate position, the keys 20 and 32 being in the positions shown.

With the key 31 in its alternate position the circuit reduces to that shown in Fig. 4, the source 3 being connected at one terminal through line 16 and key 20 to the grid as well as through key 31, resistance $R_2$ and variable resistance $r_2$ to the other terminal of the source. One terminal of the receiver 1 is connected through key 20 to the anode 19 and through key 31 and resistance $r_4$ to the cathode, the other terminal of the receiver being connected to ground and to one terminal of the source 3.

With the circuit (Fig. 4) we obtain for zero tone in receivers:

$$\frac{\mu_0}{R_p} = \frac{r_2}{r_4 R_2} \quad (4)$$

By making $r_4 R_2$ an even multiple of 10 we have—

$$\frac{\mu_0}{R_p} = r_2 \text{ (actual ohmic resis.)} \times 10^{-5} \quad (5)$$

As explained under the test for $\mu_0$, the rheostat $r_2$ is marked $\frac{1}{10}$ of its ohmic resistance. Therefore in the operation of this set the following equation holds.

$$\frac{\mu_0}{R_p} = r_2 \text{ (reading on dials)} \times 10^{-4} \quad (6)$$

The reading of the value of the mutual conductance on the dial $r_2$ will therefore not affect the direct reading, since it is merely necessary to perform the mental operation of dividing the reading by 10,000.

It is apparent therefore that this provides by means of the dial $r_2$ a direct reading for two of the tube constants, the amplification factor and the mutual inductance, the third constant, that is, the plate impedance being directly shown by the dial $R_1$.

A switch 20 may be employed to cut out of the circuit the resistances used in the above tests. The circuit may then be used for making the usual direct current tests of tube 17.

What is claimed is:

1. A testing circuit comprising an electron discharge device, means for energizing said device, balancing circuit connections comprising an adjustable resistance, said resistance being calibrated in terms of the impedance of the space discharge path between two of the electrodes of said device.

2. A testing circuit for a vacuum tube having a cathode, an anode and a control electrode which comprises means for energizing said tube, balancing circuit connections comprising an adjustable resistance, said resistance being calibrated in terms of the impedance of the space discharge path between said cathode and anode.

3. A testing circuit comprising an electron discharge device having an input and output circuit, an impedance in each of said circuits, and a switch for transferring the impedance in said output circuit to said input circuit.

4. A testing circuit comprising a three-electrode vacuum tube device, means for energizing said tube, and means comprising balancing circuit connection and a dial for reading directly a plurality of the constants of said tube.

In witness whereof, I hereunto subscribe my name this 30th day of October A. D., 1920.

HERBERT W. EVERITT.